United States Patent [19]

Yanagisawa

[11] 4,390,562
[45] Jun. 28, 1983

[54] PROCESS OF MANUFACTURING A MAGNETIC RECORD MEMBER

[75] Inventor: Masahiro Yanagisawa, Tokyo, Japan

[73] Assignee: Nippon Electric Co., Ltd., Tokyo, Japan

[21] Appl. No.: 347,389

[22] Filed: Feb. 9, 1982

Related U.S. Application Data

[62] Division of Ser. No. 260,497, May 4, 1981.

[30] Foreign Application Priority Data

May 6, 1980 [JP] Japan .................................. 55/57962
May 8, 1980 [JP] Japan .................................. 55-60898

[51] Int. Cl.³ .............................................. B05D 5/12
[52] U.S. Cl. .................................... 427/11; 427/130; 427/131; 427/132; 427/191; 427/195

[58] Field of Search ................ 427/11, 130, 131, 132, 427/191, 195

Primary Examiner—Bernard D. Pianalto
Attorney, Agent, or Firm—Sughrue, Mion, Zinn, Macpeak and Seas

[57] ABSTRACT

A magnetic record for use in magnetic disc or drum recording playback systems is provided with at least a solid lubricant thin-film outer surface. The lubricant is applied to the disc surface by rubbing under pressure to obtain a uniform lubricant layer of a thickness less than the particle diameter of the original lubricant. By properly selecting the material underlying the surface layer, the lubricant can be made to strongly adhere thereto such that an excellent lubricating effect is obtained between the record and the recording/playback head.

9 Claims, 2 Drawing Figures

PROCESS OF MANUFACTURING A MAGNETIC RECORD MEMBER

This is a division of application Ser. No. 260,497, filed May 4, 1981.

BACKGROUND OF THE INVENTION

This invention relates to a magnetic record member for use in a magnetic recording/reproducing system such as magnetic disc or drum systems, and a process for manufacturing the same.

Generally, in a magnetic recording/reproducing system including a magnetic recording/reproducing head and a magnetic record member, the process for recording or reproducing data on the record member is performed in the manner described below. First, upon initiation of operation, the head is brought into contact with the record member and then the record member is driven to rotate at a given speed to build up an air-film space between the head and the record member while the recording or reproducing operation is performed. This process is called a "contact-start-stop process" (referred to hereinafter simply as the "CSS" process). In this process, upon the completion of operation, the rotation of the record member is stopped in the state where the head and the record member are maintained in frictional contact with each other, as is the case in the starting position.

Such frictional contact causes many scars in both the record member and the head as well as some wear in the record member. Further, when the elements are maintained in frictional contact, a slight change in the attitude of the head results in a non-uniform load being imposed on the head, so that the head and the recording medium are damaged. Moreover, during the recording or reproducing operation, large frictional forces often arise between the head and the record member, causing the breakage of these elements when the head is suddenly brought into direct contact with the record member. To protect the head and the record member against such damage, a lubricant material is often provided on the surface of the record member. As such a lubricating material, oils such as perfluoroalkyl polyether, silicon oil and fluorosilicon oil have been proposed. The use of such oils, however, involves various disadvantages, as will be described hereunder.

In general, in response to the need for enhancement of the recording density of the record member, the spacing of the head from the member tends to be reduced, in addition to the reduction in the surface roughness of both the record member and the sliding face of the head. As is well known, however, any layer of liquid such as oil or water lying between such contacting surfaces with a limited roughness provides a large adhesiveness effect therebetween. Consequently, if oil is employed as a lubricant on the record member, or if the record member is placed in a humid atmosphere causing the adsorption of moisture on the record surface, a large force attributable to such adhesiveness acts between the record member and the head to resist the rotation of the record member at the starting of operation. Consequently, the head-supporting spring breaks down and, simultaneously, the head is crushed.

Several proposals for the use of lubricant materials other than oils have been made with a view to improving the resistance of the record member against wear when in contact with the head. For example, the Japanese Patent Publication No. 24805/1978 (corresponding to U.S. application Ser. No. 360,228, filed May 14, 1973) proposes the deposition of fine particles of fluorides, such as of Ce, La, Pr, Nd, or Sm, on a magnetic record medium formed of a polymer binding agent containing magnetic particles, by electromigration. Fluoride particles thus deposited however, do not adhere well to the record surface, so that they readily peel off from the record member due to sliding contact with the head. In addition, the peeled-off particles easily adhere to portions of the head to prevent it from maintaining a stable flying height, which leads to head crushing.

SUMMARY OF THE INVENTION

As is apparent from the foregoing, the protective lubricant films previously proposed generally lack good adhesiveness with the ground structure, and tend to come off or peel off due to the sliding contact with the head, resulting in the sticking of the head and the record member.

One object of the invention is, therefore, to provide a magnetic record member which has a lubricant thin-film having high adhesiveness with the ground structure, to eliminate the above-mentioned disadvantages in the prior art.

Another object of the present invention is to provide a process for manufacturing such a record member.

According to one aspect of the present invention, there is provided a magnetic record member which having a mirror-finished surface, coated with a solid thin-film fluorocarbon lubricant.

The process for manufacturing a magnetic record member according to the present invention comprises the steps of spreading, over the mirror-finished surface of the record member, solid lubricant powder; and then rubbing the lubricant powder under pressure against the surface of the record member, to form thereon a uniform thin-film of the solid material having a thickness smaller than the particle diameter of the lubricant powder.

BRIEF DESCRIPTION OF THE DRAWINGS

The above and other objects, features, and advantages of the present invention will become apparent from the following description when taken in conjunction with the accompanying drawings in which.

DETAILED DESCRIPTION OF THE PREFERRED EMBODIMENTS

Figure 1:
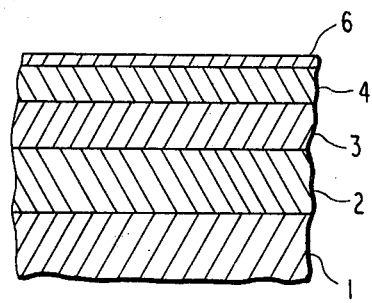
FIG. 1 is a cross-sectional view of a magnetic record member according to the present invention; and, FIG. 2 is a cross-sectional view of second embodiment thereof.

Referring to FIG. 1, the present record member includes a disc substrate 1 usually made of an aluminum alloy or a titanium alloy. The upper surface of the substrate 1 is machine-finished to a limited topography (not more than 50 microns in the circumferential direction and not more than 10 microns in the radial direction of the disc).

The surface of the substrate 1 is plated with an intermediate layer 2 of nickel-phosphorus (Ni-P) alloy, and the surface of this layer is machine-polished to a mirror finish of not more than 0.03 micron (R max) surface roughness.

A metal magnetic medium 3, of, for example, cobalt-nickel-phosphorus (Co-Ni-P) alloy is then formed by plating on the polished surface of the layer 2 and is coated with a protective film 4 of polysilicate or the like submetal oxide, as disclosed in the U.S. Pat. No. 4,162,350. The film 4 may also be formed of cobalt oxide, quartz glass, amorphous alumina, nickel oxide, chromium oxide or other metal oxides, or as a metallic film such as of chromium, Ni-P, or rhodium. Finally, a solid subricant thin-film 6 is coated on the film 4, whether it be a metal oxide film, submetal oxide film or metallic film.

The oxide material of the ground layer 4 for the solid lubricant thin film 6 is selected from the oxides of Si, Ge, Ni, Co, Fe, Cr, Al, Ti, Zr, Ga, Be, W, Ta, Cu, Ag, V, Mn, and Mo or mixtures of such oxides. Also, the layer 4, when a metallic layer, is formed on a metal selected from Co, Ni, Fe, Cr, Cu, Ti, W, Zr, and Rh, including or not including P, or of an alloy of such metals.

Figure 2:
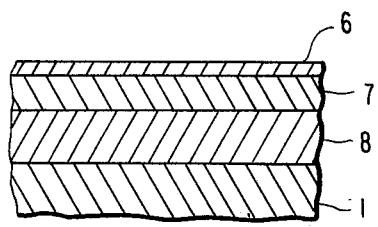

Referring to FIG. 2, another preferred form of the present record member includes a disc substrate 1 normally made of an aluminum alloy, as was the case in FIG. 1. Disposed as a ground layer on the substrate 1 is a film of a metal oxide 8, of, for example, aluminum oxide which is formed by anodization of the surface of the aluminum alloy disc substrate 1. The ground layer 8 is finished to a mirror surface of not more than 0.03 micron (R max) surface roughness by machine polishing, as was the case with the intermediate layer 2 shown in FIG. 1.

An oxide magnetic thin-film medium 7 is then formed on the mirror-finished surface of the layer 8 by vapor deposition or sputtering of a magnetic metal oxide, such as iron oxide in the form of $Fe_3O_4$ or $\gamma$-$Fe_2O_3$, by oxidization of metallic iron or by thermal decomposition of iron salts. Finally, the medium 7 is covered by a thin-film solid lubricant 6.

In this connection, it has been found that the solid lubricant thin-film adheres more firmly to the ground layer of metal oxide or submetal oxide than to a metallic ground layer, irrespective of the antinomic properties of lubricity and adhesiveness. It has also been confirmed by the inventor that the adhesiveness effect obtainable between the solid lubricant film and the ground layer is so large that the lubricant film cannot be removed even by frictional engagement between the head and the record member. Such a large adhesive force is caused by forcefully rubbing the solid lubricant powder into the surface of the record member.

Also, this large adhesive force plays an important role in forming a uniform and very thin-film from the solid lubricant powder having a relatively large particle diameter. The thickness of the thin-film may be from a few angstroms to a few hundred angstroms. In the process of forming such a lubricant film, surface portions of solid lubricant particles are transferred to the ground surface of metal oxide or submetal oxide to form thereon a uniform and very thin-film of the solid lubricant. Once the oxide ground surface is covered by such a solid lubricant thin-film layer, any further transfer or deposition of the solid lubricant is prohibited. The formation on the record surface of such a thin solid lubricant film is particularly important for the adhesiveness with the record surface, the flying stability of the head, and the prevention of head sticking. It has also been found by the inventor that a record member provided with a solid lubricant thin-film of such extreme thinness does not stick to the associated head at all, and that effective lubrication is achieved by the transfer of the solid lubricant to the head surface from the record member upon frictional contact therebetween.

The present invention will next be described in further detail in connection with a number of practical examples of the present invention and some contrasts thereto.

EXAMPLE 1

In manufacturing a magnetic disc, an aluminum alloy disc substrate 1 was finished to a very slightly topographic surface (not more than 50 microns in the circumferential direction and not more than 10 microns in the radial direction of the disc) by turning and thermal correcting processes. An intermediate layer 2 of Ni-P alloy was then plated on the substrate surface to a thickness of approximately 50 microns, and was polished to a mirror finish having a surface roughness of 0.02 micron (R max), and a thickness of 30 microns. As a magnetic recording medium 3, a Co-Ni-P alloy film having a thickness of 0.05 microns was formed by plating on the intermediate layer 2. A 2-weight percent (%) solution of tetrahydroxysilane in n-butyl alcohol was then coated over the Co-Ni-P alloy film 3 to a thickness of 0.1 micron, and was baked at 200° C. (degrees centigrade) to form a submetal oxide film 4 of polysilicate. Subsequently, a solid lubricant powder of fluorocarbon of 3 microns particle diameter was spread over the film 4 and a polishing cloth sprinkled with the same fluorocarbon powder was rubbed thereagainst under a pressure P of 1 gram/$cm^2 \leq P \leq 5$ kilograms/$cm^2$ so that a very limited proportion of fluorocarbon was transferred to the polysilicate film to form thereon a fluorocarbon thin film 6 of a thickness of a few tens of angstroms, to complete the magnetic disc.

EXAMPLE 2

Another form of a magnetic disc was fabricated in the same manner as in Example 1 except that the submetal oxide film 4 was formed of $SiO_2$ to a thickness of 0.1 micron, by sputtering.

EXAMPLE 3

A further form of a magnetic disc was fabricated in the same manner as in Example 1 except that, instead of the submetal oxide film 4, a metal oxide film 4 of Co-Ni-P alloy was formed by plating to a thickness of 0.15 micron and its surface was oxidized to form a film covering of cobalt and nickel oxides.

EXAMPLE 4

The procedure of Example 1 was followed except that a metal oxide film 4, of nickel oxide, was formed in place of the submetal oxide film 4, by oxidizing a Ni-P film of 0.1 micron thickness, plated on the Co-Ni-P film 3.

EXAMPLE 5

The procedure of Example 1 was followed except that, in place of the film 4, a metal oxide film, of copper oxide, was formed by oxidizing the surface of a copper film of 0.1 micron thickness, plated on the Co-Ni-P film.

EXAMPLE 6

The procedure of Example 1 was followed except that, in place of the film 4, a metal oxide film, of chromium oxide, was formed by oxidization of a chromium film plated on the Co-Ni-P film to a thickness of 0.1 micron.

EXAMPLE 7

The procedure of Example 1 was followed except that, in place of the film 4, a metal oxide film was formed on the Co-Ni-P film by the sputtering of aluminum oxide.

EXAMPLE 8

The procedure of Example 1 was followed except that the film 4 was formed of titanium oxide by coating the Co-Ni-P plated film with a 2 weight % n-butyl alcohol solution of titanium ethoxide, and by baking the coated film at 200° C.

EXAMPLE 9

Similar to Example 1 except that the film 4 was formed of zirconium oxide by coating a 2 weight % n-butyl alcohol solution of zirconium methoxide over the Co-Ni-P plated film, and baking the coated film at 200° C.

EXAMPLE 10

A disc substrate 1 of an aluminum alloy was covered by an anodized aluminum film as a ground layer, which was polished to a mirror finish of 0.02 micron surface roughness. On this surface, an oxide magnetic medium 7 of 0.2 micron thickness was formed by reactive vapor deposition of $Fe_3O_4$. Fluorocarbon powder, of 5 microns particle diameter, was then applied to the surface of the oxide magnetic medium 7 and rubbed thereagainst to form thereon a fluorocarbon thin film 6, to complete the magnetic disc.

EXAMPLE 11

Similar to Example 10 except that the oxide magnetic medium 7 was formed of $\gamma$-$Fe_2O_3$.

EXAMPLE 12

Similar to Example 1 except that molybdenum disulfide powder was employed as the solid lubricant powder.

EXAMPLE 13

Similar to Example 1 except that tungsten disulfide powder was employed as the solid lubricant powder.

EXAMPLE 14

Similar to Example 1 except that boron nitride (BN) powder was employed as the solid lubricant powder.

EXAMPLE 15

Similar to Example 1 except that graphite powder was employed as the solid lubricant powder.

EXAMPLE 16

Similar to Example 1 except that PbO powder was used as the solid lubricant powder.

EXAMPLE 17

Similar to Example 1 except that $CrCl_3$ powder was used as the solid lubricant powder.

EXAMPLE 18

Similar to Example 1 except that phthalocyanine powder was employed as the solid lubricant powder.

EXAMPLE 19

Similar to Example 1 except that, instead of the film 4, a metal film was formed by plating a Ni-P alloy on the Co-Ni-P film to a thickness of 0.1 micron, and a fluorocarbon thin film was formed on the plated Ni-P alloy film.

EXAMPLE 20

Similar to Example 19 except that the metal film was formed of chromium.

EXAMPLE 21

Similar to Example 19 except that the metal film was formed of rhodium.

COMPARATIVE EXAMPLE 1

A magnetic disc was fabricated in the same manner as in Example 1 except that silicone oil was coated over the film 4 of polysilicate.

COMPARATIVE EXAMPLE 2

Similar to Example 1 except that the magnetic medium 3, formed on the intermediate layer 2 plated on the disc substrate 1, was coated with a Ni-P alloy having fluorocarbon particles contained therein by eutectic plating.

COMPARATIVE EXAMPLE 3

Similar to Example 1 except that the magnetic medium 3 was coated with a porous alumina layer impregnated with particulate molybdenum disulfide.

The magnetic discs of Examples 1 to 21 and Comparative Examples 1 to 3 were each tested for repetitive CSS operation and the following results were obtained.

The magnetic disc of Comparative Example 1 was tested repeatedly, up to 2000 times, when the phenomenon of sticking or adhesiveness between the head and the magnetic disc took place, resulting in the breakdown of the headsupporting spring. The magnetic discs of Comparative Examples 2 and 3 were also tested, each up to 2000 times, and the resulting accumulation of solid lubricant between the head and the record member impaired the flying stability of the head, finally resulting in the breakdown of both the head and the record member. On the other hand, in the cases of the magnetic discs of Examples 1 to 18, each tested about 30,000 times, and those of Examples 19 to 21, each tested about 20,000 times, the flying stability of the head remained quite unchanged and no scars were produced in the head or the record member. Also, there was no sticking to the head by any of these discs.

Moreover, a moisture resistance test was performed for each disc of all the Examples over 120 hours at a humidity of 90% and a temperature of 60° C. After this test, in the magnetic discs of Comparative Examples 2 and 3, the magnetic medium was corroded with a resulting deterioration in the reproduction capability of about 50 times, as compared with the original magnetic medium. On the other hand, with the discs of Examples 1 to 21 and Comparative Example 1, no deterioration in such capability took place.

It will be appreciated from the foregoing that the magnetic discs fabricated by the process of the present invention are particularly high in reliability.

Through the embodiments described herein, it will be apparent to those skilled in the art that the present invention is also applicable to magnetic drum-type record members having the same requirements as those of a magnetic disc.

What is claimed is:

1. A process of manufacturing a magnetic record member, comprising the steps of:
    preparing an alloy disc substrate, the surface of which has a topography of not more than 50 microns in the circumferential direction and not more than 10 microns in the radial direction of the disc substrate;
    coating the surface of said disc substrate with a nonmagnetic alloy film and polishing the surface of the nonmagnetic alloy film to a mirror finish;
    forming a magnetic metal thin-film medium on the polished surface of the nonmagnetic alloy film;
    forming a protective film on the magnetic metal thin-film medium; and
    spreading dry, powdered solid lubricant over the surface of said protective film and rubbing the solid lubricant powder against said protective film under pressure to form thereon a uniform thin film of solid lubricant having a thickness smaller than the particle diameter of the solid lubricant powder.

2. A process for manufacturing a magnetic record member, comprising the steps of:
    preparing an alloy disc substrate the surface of which has a topography of not more than 50 microns in the circumferential direction and not more than 10 microns in the radial direction of the disc substrate with a nonmagnetic metal oxide film formed over said surface and polished to a mirror finish;
    forming a magnetic metal oxide thin-film medium on the nonmagnetic metal oxide film; and
    spreading dry, powdered solid lubricant over the magnetic metal oxide thin-film medium and rubbing the solid lubricant powder thereagainst under a pressure P in the range of 1 gram/cm$^2 \leq$ P $\leq$ 5 kilograms/cm$^2$ to form thereon a uniform thin-film of solid lubricant having a thickness smaller than the particle diameter of the solid lubricant powder.

3. A process as claimed in claim 2, in which the solid lubricant is one selected from the group consisting of $MoS_2$ and $WS_2$.

4. A process as claimed in claim 1 or 2, in which said solid lubricant is fluorocarbon.

5. A process as claimed in claim 1 or 2, in which the solid lubricant consists of $CrCl_3$.

6. A process as claimed in claim 1 or 2, in which the solid lubricant consists of boron nitride.

7. A process as claimed in claim 1 or 2, in which the solid lubricant consists of lead oxide.

8. A process as claimed in claim 1 or 2, in which the solid lubricant is graphite.

9. A process as claimed in claim 1 or 2, in which the solid lubricant is phthalocyanine.

* * * * *